(12) United States Patent
Lin et al.

(10) Patent No.: US 8,127,994 B2
(45) Date of Patent: Mar. 6, 2012

(54) CONTACTLESS SENSING DEVICE

(75) Inventors: Chiao-Li Lin, Taipei (TW); Chun-Wei Kuan, Hsin-Tien (TW); Yi-Hsiung Lo, Hsin-Tien (TW)

(73) Assignee: Castles Technology Co., Ltd. (TW)

( * ) Notice: Subject to any disclaimer, the term of this patent is extended or adjusted under 35 U.S.C. 154(b) by 386 days.

(21) Appl. No.: 12/574,786

(22) Filed: Oct. 7, 2009

(65) Prior Publication Data

US 2011/0079647 A1    Apr. 7, 2011

(51) Int. Cl.
    *G06K 7/10* (2006.01)
(52) U.S. Cl. ....................................... 235/454
(58) Field of Classification Search .................. 235/435, 235/436, 439, 454, 492
    See application file for complete search history.

(56) References Cited

U.S. PATENT DOCUMENTS

| | | | | |
|---|---|---|---|---|
| 6,853,093 B2 * | 2/2005 | Cohen et al. | | 257/678 |
| 7,143,942 B2 * | 12/2006 | Yamanaka et al. | | 235/454 |
| 7,552,867 B2 * | 6/2009 | Waltman | | 235/379 |
| 7,599,708 B2 * | 10/2009 | Garcia et al. | | 455/550.1 |
| 2007/0228167 A1 * | 10/2007 | Kimura et al. | | 235/454 |
| 2010/0094439 A1 * | 4/2010 | Van De Meulenhof et al. | | 700/90 |

* cited by examiner

*Primary Examiner* — Seung Lee (57) ABSTRACT

An improved contactless sensing device comprises a cover plate, a case, a base, a light-guiding module, a printed circuit board, and two lateral plates. When the sensing device senses a credit card containing a specific tag, a plurality of second light-emitting elements on the two lateral plates emit light of specific colors. The light is displayed on a light-permeable sensing element of the cover plate through the light-guiding module and a second opening of the housing.

13 Claims, 6 Drawing Sheets

CONTACTLESS SENSING DEVICE

BACKGROUND OF THE INVENTION

1. Technical Field

The present invention relates to an improved contactless sensing device and, more particularly, to a contactless sensing device comprising a plurality of light-emitting elements whose light is displayed on a light-permeable sensing element through a light-guiding module.

2. Description of Related Art

While the concept of credit cards emerged as early as the mid-eighteenth century, it was not until the early twentieth century that the first credit card took shape. Auther Morris of the United States invented the credit card at the turn of the twentieth century, when credit cards were made of metal. The early credit cards had a very limited number of users and were accepted only in specific stores. However, the idea of "use before payment" was so welcome that many large enterprises gradually began to issue credit cards. In 1924, the General Petroleum Corporation of the United State issued credit cards for purchasing gasoline. These gasoline credit cards were first offered to company employees and select customers as VIP cards and, due to the warm response from card users, were subsequently offered to the general public as a means of promotion. Under heated competition, other petroleum companies followed suite and issued their own credit cards, which eventually led to the booming of the credit card market. Companies in other industries, such as the telephone, airline, and railway industries, also issued credit cards to attract more customers and business.

The prototype of modern credit cards was not established until the issue of Diners cards in 1951. From then on, the Diners Club, the issuer of Diners cards, advanced payments for cardholders and charged participating merchants a merchant discount fee. This operation model is still in use today. On the other hand, merchants accepting Diners cards have expanded from restaurants to retailers and travel-related companies. In 1959, the American Express Company began issuing the American Express cards, and the card business soon reached beyond the Unite States due to the company's ample experience as a travel agency.

In a nutshell, the development of credit cards in the 1950s set an operation model in which cardholders need not pay cash for their purchases while issuer banks charge franchised merchants a merchant discount fee. Besides, credit cards also provide revolving credit and thus allow cardholders to reimburse the issuer banks in a more flexible way. From 1950s onward, as cardholders grew accustomed to using the revolving credit, the credit card business of banks took flight.

A conventional credit card reader has a surface provided with a message display screen. All messages that occur during a transaction are displayed on the message display screen in words. Therefore, with this displaying mode, an operator must read the displayed content word after word to know the transaction-related messages. It will be more time-saving and convenient if the transaction-related messages are displayed in a more intuitive manner.

Moreover, the conventional credit card reader has a surface formed with a slot. A credit card is inserted into the slot so as for a reading module in the reader to read information from a magnetic stripe or a chip of the credit card before subsequent transaction steps are carried out. While using the conventional credit card reader, the credit card must be inserted into the slot in a specific direction and with a specific end surface of the credit card facing the operator; otherwise, the reading module cannot read the information from the magnetic stripe or the chip of the credit card. Nevertheless, if the credit card is not marked with an insertion direction indicator, or if the insertion direction indicator is not clear, it may take a few trials to insert the credit card properly, which is inconvenient. In addition, as the number of times that the credit card is inserted into the slot increases, the credit card itself or the reader tends to be worn. Hence, the conventional credit card reader also needs improvement in these respects.

BRIEF SUMMARY OF THE INVENTION

In view of the aforementioned problems and drawbacks of the prior art, the inventor of the present invention put years of experience, as well as imagination and creativity, into practice and, after repeated trials and modifications, finally obtained an improved contactless sensing device as disclosed herein.

The first objective of the present invention is to provide a contactless sensing device. After the sensing device senses a credit card or some other object containing a specific tag, subsequent transaction statuses are displayed on a message display panel of a printed circuit board. Meanwhile, the printed circuit board also instructs a plurality of first light-emitting elements on the printed circuit board and a plurality of second light-emitting elements on two lateral plates to emit light of specific colors. The light emitted by the first light-emitting elements passes through light-emitting element receiving holes of a case and is displayed through light display holes of a cover plate. The light emitted by the second light-emitting elements is displayed on a light-permeable sensing element of the cover plate through a light-guiding module and a second opening of the case.

The second objective of the present invention is to provide a contactless sensing device such that, when a credit card or some other object containing a specific tag approaches a sensing element on a cover plate, an antenna module of a printed circuit board detects and obtains information of the tag through the sensing element, so as to perform subsequent steps such as carrying out a transaction or exchanging information. Thus, not only is the transaction process simplified, but also the credit card or the object is less likely to be worn.

To achieve the foregoing objectives, the present invention provides a contactless sensing device comprising a cover plate, a case, a base, a light-guiding module, a printed circuit board, and two lateral plates. The cover plate includes a transparent display window, a plurality of light display holes, and a sensing element, wherein the sensing element is made of a light-permeable material. The case has an end surface coupled to the cover plate. In addition, the case is provided with a first opening, a plurality of light-emitting element receiving holes, and a second opening, wherein the first opening corresponds in position to the transparent display window of the cover plate, the light-emitting element receiving holes correspond in position and number to the light display holes of the cover plate, and the second opening corresponds in position to the sensing element of the cover plate. The base is coupled to an end surface of the case that is opposite the end surface coupled to the cover plate. Thus, the case and the base jointly form an accommodating space therebetween. The light-guiding module includes an upper diffuser plate, a light-guiding plate, and a lower diffuser plate, wherein the upper diffuser plate is a hollow frame-shaped structure, and the light-guiding plate is sandwiched between the upper diffuser plate and the lower diffuser plate. The light-guiding module is provided in the accommodating space formed between the case and the base. Moreover, the upper diffuser plate of the light-guiding module has an end surface connected to a periphery of the second opening of the case. The printed circuit board is provided in the accommodating space formed between the case and the base. Besides, the printed circuit board has a surface partially coupled to an end surface of the lower diffuser plate of the light-guiding module. The printed circuit board is provided with an antenna module, a power starter, a message display panel, a plurality of first light-emitting elements, at least one battery, at least one external computer connection hole, at least one security mechanism card, and at least one audio alarm module. The antenna module is configured to detect an object containing a specific tag through the sensing element of the cover plate and transmit information of the tag to the printed circuit board. The message display panel and the first light-emitting elements are provided on an end surface of the printed circuit board that faces the case and the cover plate. The message display panel of the printed circuit board corresponds in position to the first opening of the case and the transparent display window of the cover plate. The first light-emitting elements of the printed circuit board correspond in position and number to the light-emitting element receiving holes of the case and the light display holes of the cover plate. Each of the first light-emitting elements emits light of a different color. The two lateral plates are coupled respectively to two opposite inner lateral surfaces of the accommodating space formed between the case and the base. Moreover, the two lateral plates are adjacent to lateral sides of the light-guiding module, respectively. Each lateral plate has an end surface facing the light-guiding module and provided with a plurality of second light-emitting elements arranged lengthwise and linearly along the each lateral plate. The second light-emitting elements are of various colors, and the second light-emitting elements of the various colors are arranged alternately and linearly on each of the two lateral plates. After receiving the information transmitted by the antenna module, the printed circuit board displays ongoing processing statuses on the message display panel. Meanwhile, the printed circuit board instructs the first light-emitting elements and the second light-emitting elements to emit light whose colors correspond to different conditions. The light emitted by the first light-emitting elements passes through the light-emitting element receiving holes of the case and is displayed through the light display holes of the cover plate. The light emitted by the second light-emitting elements is displayed on the light-permeable sensing element of the cover plate through the light-guiding module and the second opening of the case.

BRIEF DESCRIPTION OF THE SEVERAL VIEWS OF THE DRAWINGS

The invention as well as a preferred mode of use, further objectives, and advantages thereof will be best understood by referring to the following detailed description of illustrative embodiments in conjunction with the accompanying drawings, in which.

DETAILED DESCRIPTION OF THE INVENTION

In order to achieve the foregoing objectives and effects, the inventor of the present invention uses not only a radio-frequency sensing technique as a tag reading mechanism, but also a message display panel and plural light-emitting elements for showing transaction statuses at the same time, so as to obtain a contactless sensing device as disclosed herein. The structural concept and implementation methods of the present invention are detailed hereinafter with reference to a first preferred embodiment and a second preferred embodiment.

Figure 1:
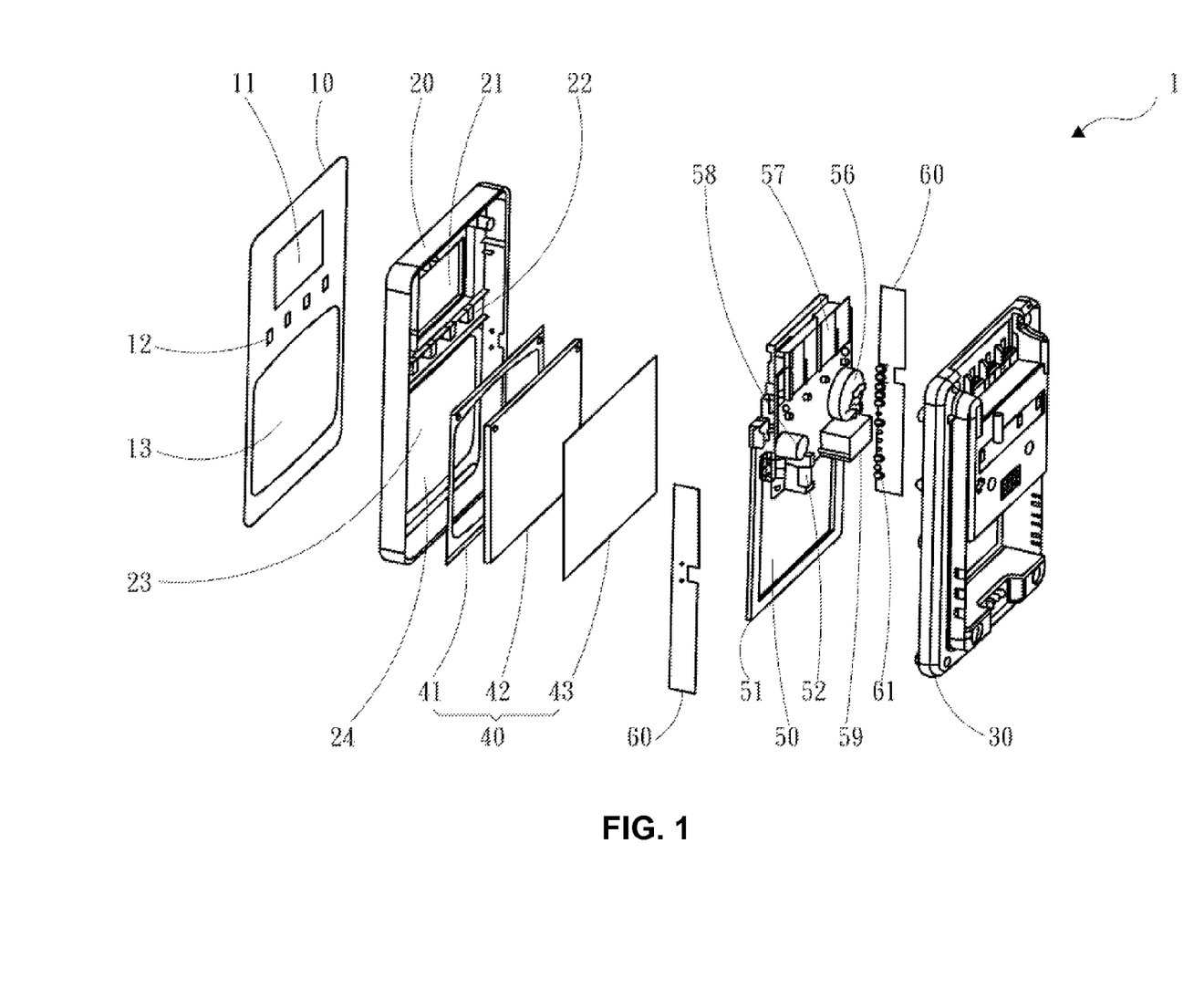
FIG. 1 is an exploded perspective view of a contactless sensing device according to a first preferred embodiment of the present invention.
Figure 2:
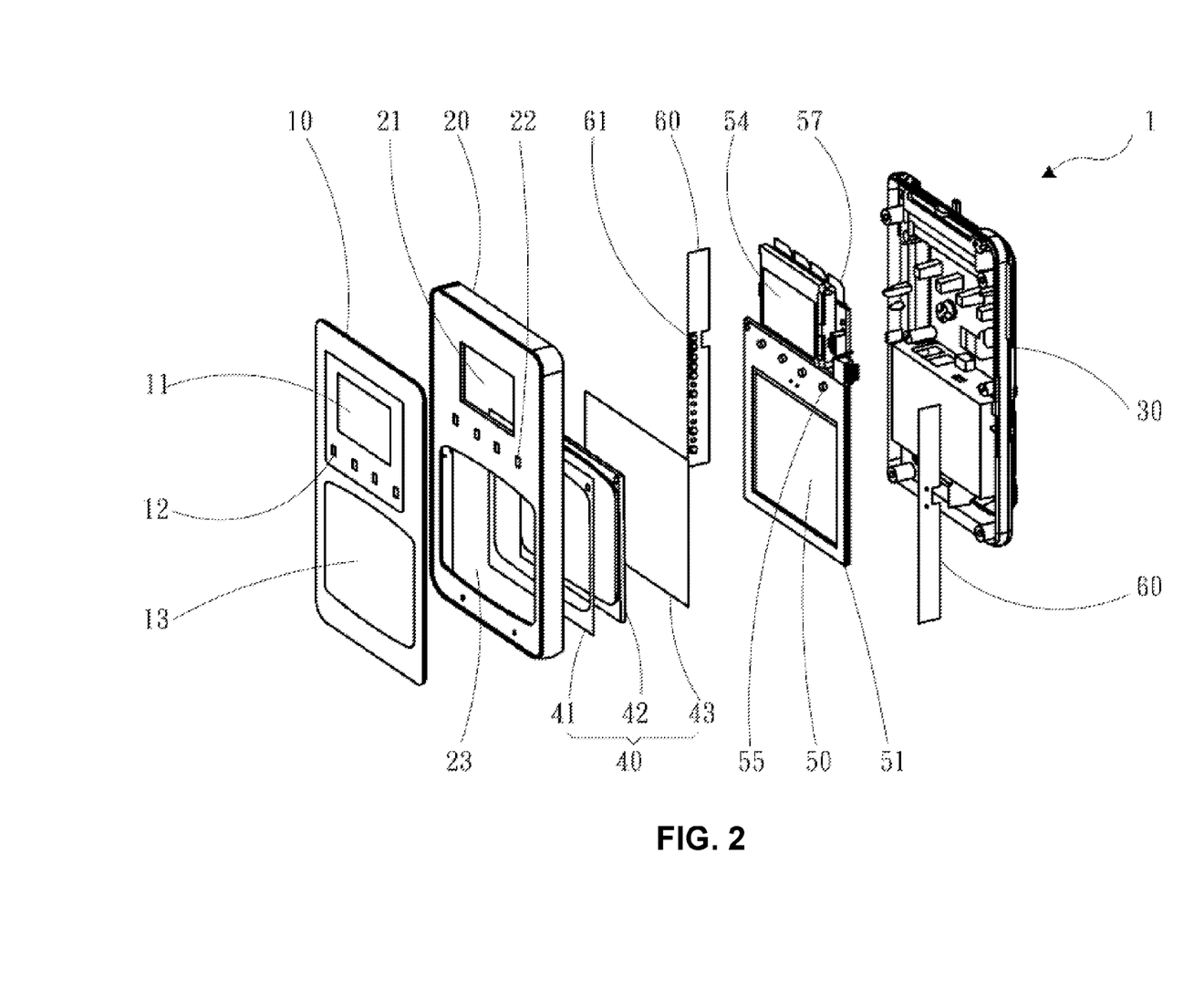
FIG. 2 is an exploded perspective view of the contactless sensing device in FIG. 1 from a different viewing angle.
Figure 3:
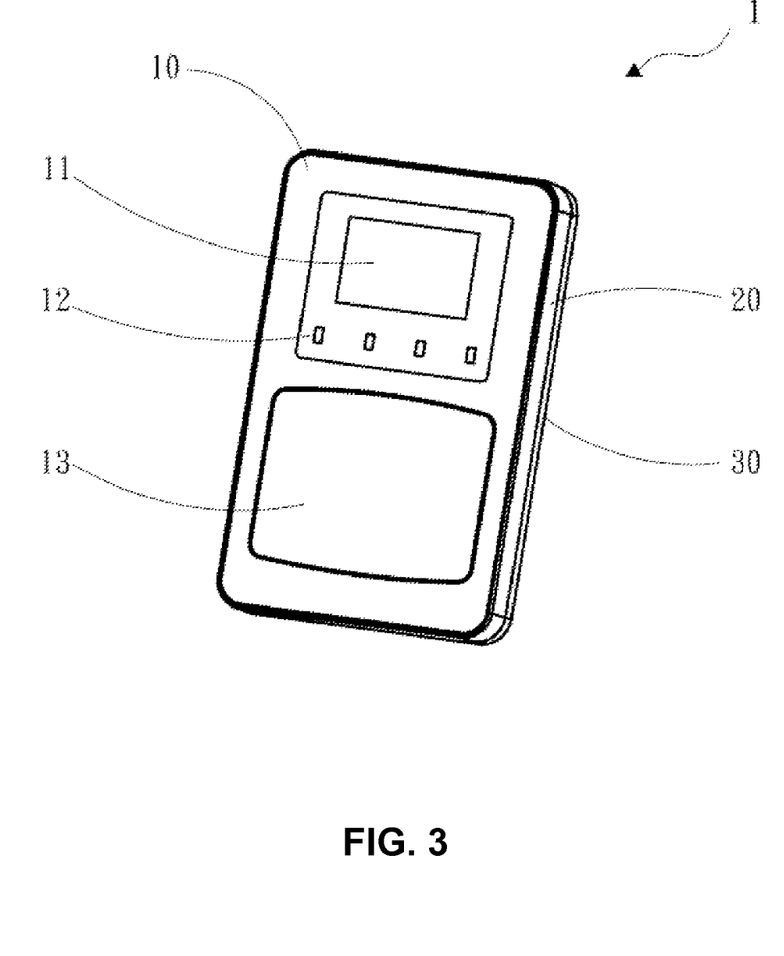
FIG. 3 is an assembled perspective view of the contactless sensing device according to the first preferred embodiment of the present invention.

Referring to FIGS. 1 to 3 for two exploded perspective views and an assembled perspective view of a contactless sensing device 1 according to the first preferred embodiment of the present invention, the contactless sensing device 1 includes a cover plate 10, a case 20, a base 30, a light-guiding module 40, a printed circuit board 50, and two lateral plates 60.

The cover plate 10 is provided with a transparent display window 11, a plurality of light display holes 12, and a sensing element 13. The sensing element 13 is made of a light-permeable material.

The case 20 has an end surface coupled to the cover plate 10. The case 20 is provided with a first opening 21, a plurality of light-emitting element receiving holes 22, and a second opening 23. The first opening 21 of the case 20 corresponds in position to the transparent display window 11 of the cover plate 10. The light-emitting element receiving holes 22 of the case 20 correspond in position and number to the light display holes 12 of the cover plate 10. The second opening 23 of the case 20 corresponds in position to the sensing element 13 of the cover plate 10.

The base 30 is coupled to an end surface of the case 20 that is opposite the end surface coupled to the cover plate 10. Thus, the case 20 and the base 30 jointly form an accommodating space 24 therebetween.

The light-guiding module 40 comprises an upper diffuser plate 41, a light-guiding plate 42, and a lower diffuser plate 43. The upper diffuser plate 41 is a hollow frame-shaped structure. The light-guiding plate 42 is sandwiched between the upper diffuser plate 41 and the lower diffuser plate 43. The light-guiding module 40 is provided in the accommodating space 24 formed between the case 20 and the base 30. Moreover, the upper diffuser plate 41 of the light-guiding module 40 has an end surface connected to a periphery of the second opening 23 of the case 20.

The printed circuit board 50 is provided in the accommodating space 24 formed between the case 20 and the base 30. The printed circuit board 50 has a surface partially coupled to an end surface of the lower diffuser plate 43 of the light-guiding module 40. The printed circuit board 50 is provided with an antenna module 51, a power starter 52, a message display panel 54, a plurality of first light-emitting elements 55, a battery 56, a plurality of security mechanism cards 57, an audio alarm module 58, and an external computer connection hole 59. The antenna module 51 detects an object containing a specific tag via the sensing element 13 of the cover plate 10 and then transmits information of the tag to the printed circuit board 50. The message display panel 54 and the first light-emitting elements 55 are provided on an end surface of the printed circuit board 50 that faces the case 20 and the cover plate 10. Furthermore, the message display panel 54 of the printed circuit board 50 corresponds in position to the first opening 21 of the case 20 and the transparent display window 11 of the cover plate 10. On the other hand, the first light-emitting elements 55 of the printed circuit board 50 correspond in position and number to the light-emitting element receiving holes 22 of the case 20 and the light display holes 12 of the cover plate 10. The first light-emitting elements 55 are light-emitting diodes (LEDs), and each first light-emitting element 55 emits light of a different color.

The two lateral plates 60 are coupled respectively to two opposite inner lateral surfaces of the accommodating space 24 formed between the case 20 and the base 30. In addition, the two lateral plates 60 are adjacent to lateral sides of the light-guiding module 40, respectively. Each lateral plate 60 has an end surface facing the light-guiding module 40 and provided with a plurality of second light-emitting elements 61, wherein the second light-emitting elements 61 are arranged lengthwise and linearly along each lateral plate 60. The second light-emitting elements 61 are LEDs and are of various colors. The second light-emitting elements 61 of the various colors are arranged alternately and linearly on each lateral plate 60.

After receiving the information transmitted by the antenna module 51, the printed circuit board 50 displays ongoing processing statuses on the message display panel 54. At the same time, the printed circuit board 50 instructs the first light-emitting elements 55 and the second light-emitting elements 61 to emit light whose colors correspond to different conditions. The light emitted by the first light-emitting elements 55 passes through the light-emitting element receiving holes 22 of the case 20 and is displayed through the light display holes 12 of the cover plates 10. The light emitted by the second light-emitting elements 61 is displayed on the light-permeable sensing element 13 of the cover plate 10 through the light-guiding module 40 and the second opening 23 of the case 20.

In the first preferred embodiment, the light-guiding plate 42 transmits the light emitted by the second light-emitting elements 61 to the upper diffuser plate 41, the lower diffuser plate 43, and the sensing element 13 of the cover plate 10. The upper diffuser plate 41 and the lower diffuser plate 43 render uniform the light emitted by the second light-emitting elements 61 so that the light is transmitted uniformly to the sensing element 13 of the cover plate 10.

Furthermore, in the first preferred embodiment, the cover plate 10, the case 20, the base 30, the light-guiding module 40, the printed circuit board 50, and the two lateral plates 60 are coupled together by fastening with screws. Alternatively, instead of using screws, the above components are coupled together via engagement between hook structures.

Figure 4A:
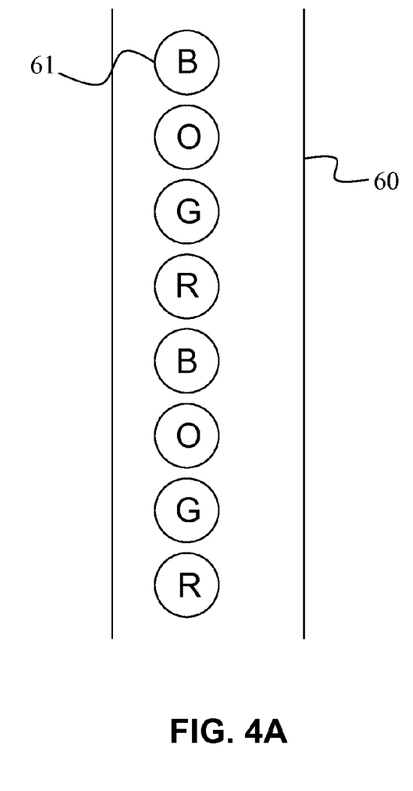
FIG. 4A schematically shows colors and arrangement of second light-emitting elements in the first preferred embodiment.
Figure 4B:
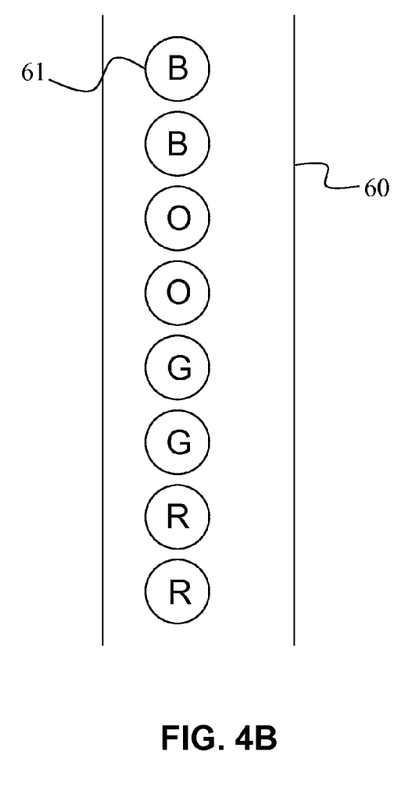
FIG. 4B schematically shows another arrangement of the second light-emitting elements in the first preferred embodiment.

Please refer to FIG. 4A for a schematic drawing showing the colors and arrangement of the second light-emitting elements 61 in the first preferred embodiment. The second light-emitting elements 61 are of four colors, namely blue (B), orange (O), green (G), and red (R). The blue (B) color indicates "ready for transaction" (i.e., a standby state); the orange (O) color indicates "transaction in progress"; the green (G) color indicates "transaction completed"; and the red (R) color indicates "transaction failure". As shown in FIG. 4A, the second light-emitting elements 61 are arranged in the order of blue (B), orange (O), green (G), red (R), blue (B), orange (O), green (G), and red (R). In other words, the second light-emitting elements 61 are sequentially arranged on the lateral plate 60 by color, and the second light-emitting elements 61 of the same color show up one at a time. Another arrangement of the second light-emitting elements 61 is shown in FIG. 4B, wherein the second light-emitting elements 61 are arranged in the order of blue (B), blue (B), orange (O), orange (O), green (G), green (G), red (R), and red (R). In other words, the second light-emitting elements 61 are also sequentially arranged on the lateral plate 60 by color, but the second light-emitting elements 61 of the same color show up in pairs. In practice, the colors and arrangement of the second light-emitting elements 61 may vary as appropriate and are not limited to those shown in FIG. 4A and FIG. 4B.

Figure 5:
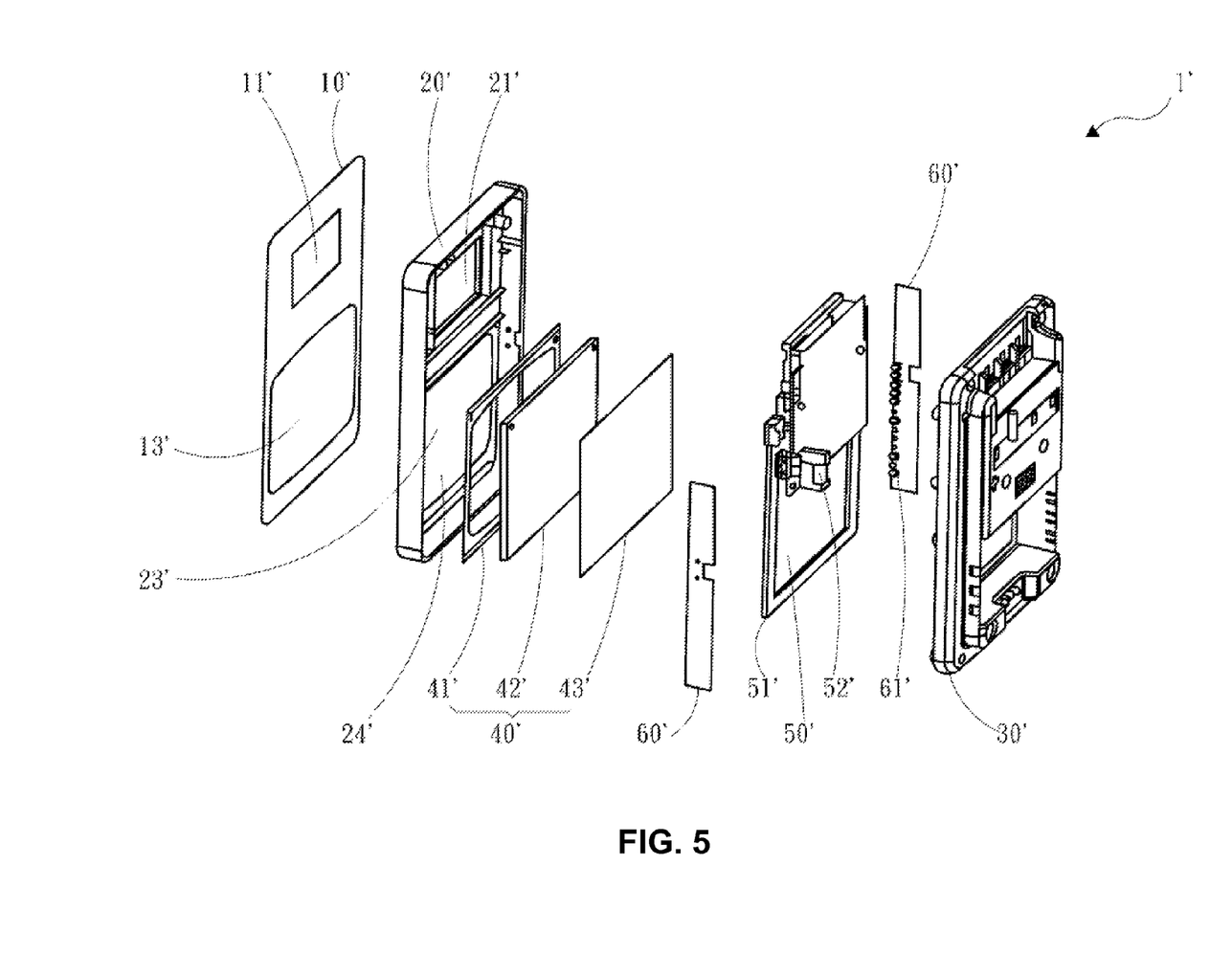
FIG. 5 is an exploded perspective view of a contactless sensing device according to a second preferred embodiment of the present invention.
Figure 6:
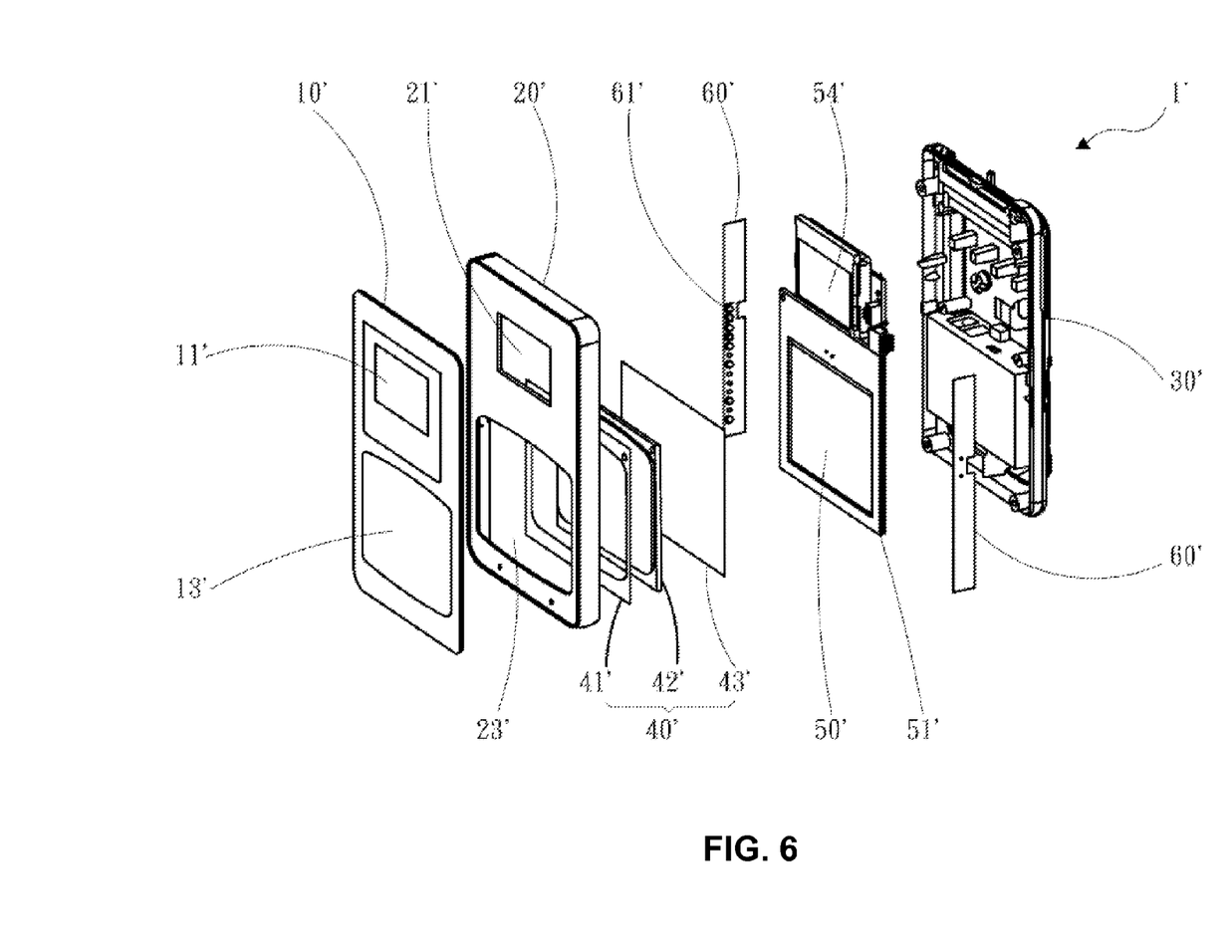
FIG. 6 is an exploded perspective view of the contactless sensing device in FIG. 5 from a different viewing angle.

Please refer to FIG. 5 and FIG. 6 for an exploded perspective view of a contactless sensing device 1' according to the second preferred embodiment of the present invention and an exploded perspective view of the same contactless sensing device 1' from a different viewing angle. The contactless sensing device 1' includes a cover plate 10', a case 20', a base 30', a light-guiding module 40', a printed circuit board 50', and two lateral plates 60'.

The cover plate 10' is provided with a transparent display window 11' and a sensing element 13'. The sensing element 13' is made of a light-permeable material.

The case 20' has an end surface coupled to the cover plate 10'. The case 20' is provided with a first opening 21' and a second opening 23'. The first opening 21' of the case 20' corresponds in position to the transparent display window 11' of the cover plate 10'. The second opening 23' of the case 20' corresponds in position to the sensing element 13' of the cover plate 10'.

The base 30' is coupled to an end surface of the case 20' that is opposite the end surface coupled to the cover plate 10'. Thus, the case 20' and the base 30' jointly form an accommodating space 24' therebetween.

The light-guiding module 40' comprises an upper diffuser plate 41', a light-guiding plate 42', and a lower diffuser plate 43'. The upper diffuser plate 41' is a hollow frame-shaped structure. The light-guiding plate 42' is sandwiched between the upper diffuser plate 41' and the lower diffuser plate 43'. The light-guiding module 40' is provided in the accommodating space 24' formed between the case 20' and the base 30'. Moreover, the upper diffuser plate 41' of the light-guiding module 40' has an end surface connected to a periphery of the second opening 23' of the case 20'.

The printed circuit board 50' is provided in the accommodating space 24' formed between the case 20' and the base 30'. The printed circuit board 50' has a surface partially coupled to an end surface of the lower diffuser plate 43' of the light-guiding module 40'. The printed circuit board 50' is provided with an antenna module 51', a power starter 52', and a message display panel 54'. The antenna module 51' detects an object containing a specific tag via the sensing element 13' of the cover plate 10' and then transmits information of the tag to the printed circuit board 50'. The message display panel 54' is provided on an end surface of the printed circuit board 50' that faces the case 20' and the cover plate 10'. Furthermore, the message display panel 54' of the printed circuit board 50' corresponds in position to the first opening 21' of the case 20' and the transparent display window 11' of the cover plate 10'.

The two lateral plates 60' are coupled respectively to two opposite inner lateral surfaces of the accommodating space 24' formed between the case 20' and the base 30'. In addition, the two lateral plates 60' are adjacent to lateral sides of the light-guiding module 40', respectively. Each lateral plate 60' has an end surface facing the light-guiding module 40' and provided with a plurality of light-emitting elements 61', wherein the light-emitting elements 61' are arranged lengthwise and linearly along each lateral plate 60', and the light-emitting elements 61' are of various colors. The light-emitting elements 61' of the various colors are arranged alternately and linearly on each lateral plate 60'. Moreover, the light-emitting elements 61' are LEDs. The colors and arrangement of the light-emitting elements 61' are the same as those of the second light-emitting elements 61 in the first preferred embodiment and therefore are not repeated herein.

After receiving the information transmitted by the antenna module 51', the printed circuit board 50' displays ongoing processing statuses on the message display panel 54' while instructing the light-emitting elements 61' to emit light. The light emitted by the light-emitting elements 61' is displayed on the light-permeable sensing element 13' of the cover plate 10' through the light-guiding module 40' and the second opening 23' of the case 20'.

In the second preferred embodiment, the light-guiding plate 42' transmits the light emitted by the light-emitting elements 61' to the upper diffuser plate 41', the lower diffuser plate 43', and the sensing element 13' of the cover plate 10'. The upper diffuser plate 41' and the lower diffuser plate 43' render uniform the light emitted by the light-emitting elements 61' so that the light is transmitted uniformly to the sensing element 13' of the cover plate 10'.

Furthermore, in the second preferred embodiment, the cover plate 10', the case 20', the base 30', the light-guiding module 40', the printed circuit board 50', and the two lateral plates 60' are coupled together by fastening with screws. Alternatively, instead of using screws, the above components are coupled together via engagement between hook structures.

In the first and second preferred embodiments described above, the antenna modules 51, 51' of the printed circuit boards 50, 50' sense and read credit cards or other objects containing specific tags by the Radio Frequency Identification (RFID) technique. More specifically, radio signals are used to identify specific targets and read and write related data in the absence of mechanical or optical connection between the specific targets and an identification system. The RFID technique involves a whole set of information technique infrastructure which include such devices as RFID tags, also known as radio-frequency tags or electronic tags, RFID reading/writing equipment, and corresponding information service systems. An RFID tag is composed mainly of a large-scale integrated circuit for storing an identification code, and an antenna for receiving and transmitting signals. Nowadays, RFID tags are mostly passive tags, meaning the RFID tags are powered by radio wave energy received by their antennas. Compared with the barcode technology, the radio-frequency technology is more advantageous as it provides larger capacity, has longer communication distance, protects against duplication, is more tolerant to changes in the environment, and is capable of reading several tags at the same time.

The improvement brought by present invention to existing contactless sensing devices and the effects of the present invention can be readily understood from the foregoing detailed description of the preferred embodiments. In short, the system structure disclosed herein has the following advantages:

1. The present invention uses light-emitting elements of different colors to provide visual alerts of different colors corresponding to different transaction statuses. Thus, a user is enabled to know intuitively the present transaction state, thereby facilitating subsequent operations and expediting transaction.
2. As the present invention uses a wireless sensing technique to mediate transaction, transaction can be carried out without placing a credit card or other types of transaction cards in contact with a transaction device. Therefore, not only is the transaction process simplified and accelerated, but also the cards and the transaction device are prevented from wear.

What is claimed is:

1. A contactless sensing device, comprising:
   a cover plate provided with a transparent display window, a plurality of light display holes, and a sensing element, wherein the sensing element is made of a light-permeable material;
   a case having an end surface coupled to the cover plate, the case being provided with a first opening, a plurality of light-emitting element receiving holes, and a second opening, the first opening corresponding in position to the transparent display window of the cover plate, the light-emitting element receiving holes corresponding in position and number to the light display holes of the cover plate, the second opening corresponding in position to the sensing element of the cover plate;
   a base coupled to an end surface of the case that is opposite the end surface coupled to the cover plate, such that the case and the base jointly form a accommodating space therebetween;
   a light-guiding module comprising an upper diffuser plate, a light-guiding plate, and a lower diffuser plate, the upper diffuser plate being a hollow frame-shaped structure, the light-guiding plate being sandwiched between the upper diffuser plate and the lower diffuser plate, the light-guiding module being provided in the accommodating space formed between the case and the base, wherein the upper diffuser plate of the light-guiding module has an end surface connected to a periphery of the second opening of the case;
   a printed circuit board provided in the accommodating space formed between the case and the base, the printed circuit board having a surface partially coupled to an end surface of the lower diffuser plate of the light-guiding module, the printed circuit board being provided with an antenna module, a power starter, a message display panel, a plurality of first light-emitting elements, at least a battery, at least an external computer connection hole, at least a security mechanism card, and at least an audio alarm module, the antenna module being configured to detect an object containing a specific tag through the sensing element of the cover plate and transmit information of the tag to the printed circuit board, the message display panel and the first light-emitting elements being provided on an end surface of the printed circuit board that faces the case and the cover plate, the message display panel corresponding in position to the first opening of the case and the transparent display window of the cover plate, the first light-emitting elements corresponding in position and number to the light-emitting element receiving holes of the case and the light display holes of the cover plate, wherein each said first light-emitting element emits light of a different color; and
   two lateral plates coupled respectively to two opposite inner lateral surfaces of the accommodating space formed between the case and the base, the two lateral plates being adjacent to lateral sides of the light-guiding module, respectively, each said lateral plate having an end surface which faces the light-guiding module and is provided with a plurality of second light-emitting elements arranged lengthwise and linearly along the each said lateral plate, wherein the second light-emitting elements are of various colors, and the second light-emitting elements of the various colors are arranged alternately and linearly on the each said lateral plate;

wherein the printed circuit board, after receiving the information transmitted by the antenna module, displays ongoing processing statuses on the message display panel while instructing the first light-emitting elements and the second light-emitting elements to emit light whose colors correspond to different conditions, wherein the light emitted by the first light-emitting elements passes through the light-emitting element receiving holes of the case and is displayed through the light display holes of the cover plate, and the light emitted by the second light-emitting elements is displayed on the light-permeable sensing element of the cover plate through the light-guiding module and the second opening of the case.

2. The contactless sensing device of claim 1, wherein coupling among the cover plate, the case, the base, the light-guiding module, the printed circuit board, and the two lateral plates is by fastening with screws.

3. The contactless sensing device of claim 1, wherein coupling among the cover plate, the case, the base, the light-guiding module, the printed circuit board, and the two lateral plates is by engagement between hook structures.

4. The contactless sensing device of claim 1, wherein the light-guiding plate transmits the light emitted by the second light-emitting elements to the upper diffuser plate, the lower diffuser plate, and the sensing element of the cover plate.

5. The contactless sensing device of claim 1, wherein the light emitted by the second light-emitting elements is rendered uniform by the upper diffuser plate and the lower diffuser plate so as to be transmitted uniformly to the sensing element of the cover plate.

6. The contactless sensing device of claim 1, wherein the first light-emitting elements are light-emitting diodes (LEDs).

7. The contactless sensing device of claim 1, wherein the second light-emitting elements are light-emitting diodes (LEDs).

8. A contactless sensing device, comprising:
a cover plate provided with a transparent display window and a sensing element, wherein the sensing element is made of a light-permeable material;
a case having an end surface coupled to the cover plate, the case being provided with a first opening and a second opening, the first opening corresponding in position to the transparent display window of the cover plate, the second opening corresponding in position to the sensing element of the cover plate;
a base coupled to an end surface of the case that is opposite the end surface coupled to the cover plate, such that the case and the base jointly form a accommodating space therebetween;
a light-guiding module comprising an upper diffuser plate, a light-guiding plate, and a lower diffuser plate, the upper diffuser plate being a hollow frame-shaped structure, the light-guiding plate being sandwiched between the upper diffuser plate and the lower diffuser plate, the light-guiding module being provided in the accommodating space formed between the case and the base, wherein the upper diffuser plate of the light-guiding module has an end surface connected to a periphery of the second opening of the case;
a printed circuit board provided in the accommodating space formed between the case and the base, the printed circuit board having a surface partially coupled to an end surface of the lower diffuser plate of the light-guiding module, the printed circuit board being provided with an antenna module, a power starter, and a message display panel, the antenna module being configured to detect an object containing a specific tag through the sensing element of the cover plate and transmit information of the tag to the printed circuit board, the message display panel being provided on an end surface of the printed circuit board that faces the case and the cover plate, the message display panel corresponding in position to the first opening of the case and the transparent display window of the cover plate; and
two lateral plates coupled respectively to two opposite inner lateral surfaces of the accommodating space formed between the case and the base, the two lateral plates being adjacent to lateral sides of the light-guiding module, respectively, each said lateral plate having an end surface which faces the light-guiding module and is provided with a plurality of light-emitting elements arranged lengthwise and linearly along the each said lateral plate, wherein the light-emitting elements are of various colors, and the light-emitting elements of the various colors are arranged alternately and linearly on the each said lateral plate;
wherein the printed circuit board, after receiving the information transmitted by the antenna module, displays ongoing processing statuses on the message display panel while instructing the light-emitting elements to emit light, wherein the light emitted by the light-emitting elements is displayed on the light-permeable sensing element of the cover plate through the light-guiding module and the second opening of the case.

9. The contactless sensing device of claim 8, wherein coupling among the cover plate, the case, the base, the light-guiding module, the printed circuit board, and the two lateral plates is by fastening with screws.

10. The contactless sensing device of claim 8, wherein coupling among the cover plate, the case, the base, the light-guiding module, the printed circuit board, and the two lateral plates is by engagement between hook structures rather than by fastening with screws.

11. The contactless sensing device of claim 8, wherein the light-guiding plate transmits the light emitted by the light-emitting elements to the upper diffuser plate, the lower diffuser plate, and the sensing element of the cover plate.

12. The contactless sensing device of claim 8, wherein the light emitted by the light-emitting elements is rendered uniform by the upper diffuser plate and the lower diffuser plate so as to be transmitted uniformly to the sensing element of the cover plate.

13. The contactless sensing device of claim 8, wherein the light-emitting elements are light-emitting diodes (LEDs).

* * * * *